July 18, 1933.  S. RUBEN  1,918,717
ELECTRICAL CONDENSER
Filed June 23, 1932  2 Sheets-Sheet 1
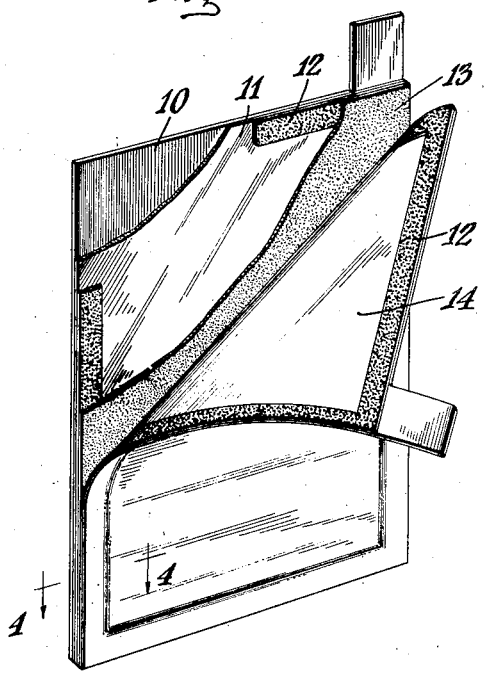
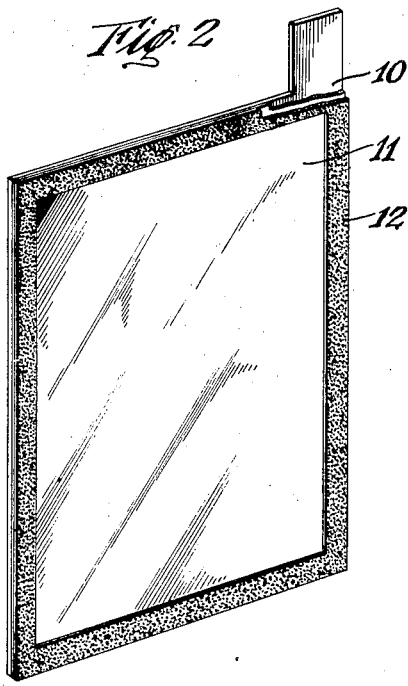
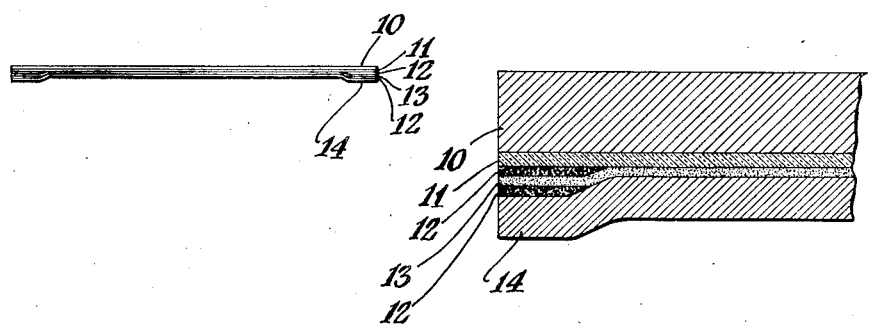
INVENTOR
BY Samuel Ruben
Watson, Bristol, Johnson & Leavenworth
ATTORNEYS

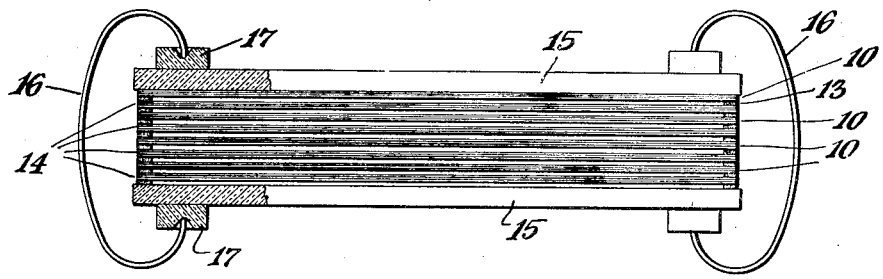
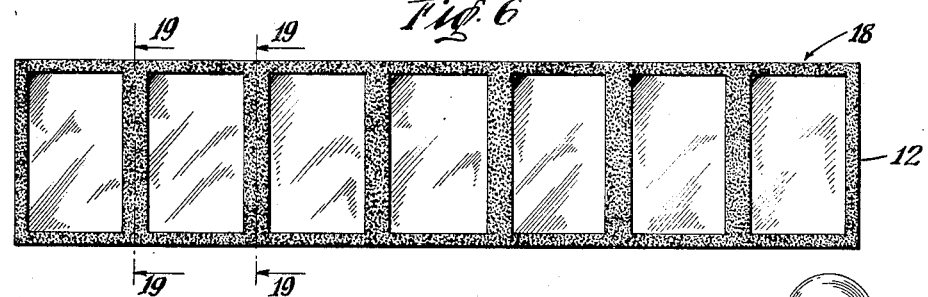
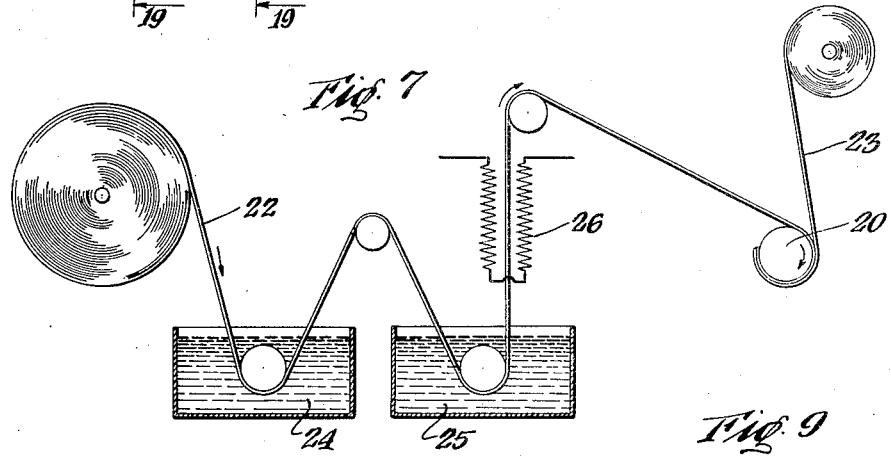
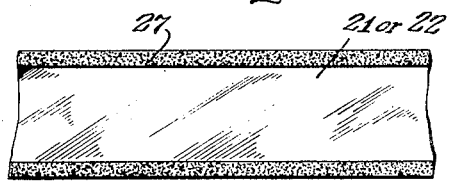
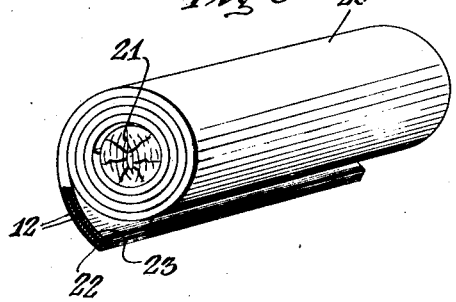

Patented July 18, 1933

1,918,717

UNITED STATES PATENT OFFICE

SAMUEL RUBEN, OF NEW ROCHELLE, NEW YORK, ASSIGNOR TO RUBEN CONDENSER COMPANY, OF NEW ROCHELLE, NEW YORK, A CORPORATION OF DELAWARE

ELECTRICAL CONDENSER

Application filed June 23, 1932. Serial No. 618,872.

This invention relates to electrical condensers and a method of making such devices and, more particularly, to such condensers which have a current-blocking film on at least one electrode and a film-maintaining composition interposed between the electrodes and in physical contact with the current-blocking film and a method of making one form of such devices.

General objects of the invention are the provision of such condensers which are compact in form, have an efficiency in operation heretofore unattainable and a long service life and can be economically and readily constructed, and the provision of a method for rapidly and efficiently making one form of such devices.

More specific objects of the invention are the provision of a tacky, electrically conductive film-maintaining composition including a lacquer base material, preferably a cellulose derivative such as nitro-cellulose and cellulose acetate, and a plasticising constituent miscible therewith which renders the composition electrically conductive and maintains the plastic or tacky condition thereof, and including, if desired, small amounts of an inert filler and an organic acid; and the provision of a condenser having an anode provided with a current-blocking film over which a thin layer of such plastic or tacky composition is placed to space the other electrode a minimum distance therefrom, while efficiently protecting and maintaining the current-blocking film both physically and electrically with a minimum of dissolution and/or corrosion thereof and characterized by a high capacitance per unit area, low power factor loss, a minimum bulk, long life, low cost and which is capable of efficiently withstanding high temperatures, atmospheric conditions and changes thereof, and is capable of operation in series without the provision of special voltage distributing means.

An additional object is the provision of a method for efficiently making condensers of this type in coiled form by a minimum number of operations capable of being carried out successively by passing a continuous film-formed sheet of metallic material through a lacquer solution and through a drier and to a coiling device which rolls the treated sheet up with another electrode sheet thereby decreasing the number of operations to be performed by hand.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawings, in which:

Fig. 1 is a perspective view of one form of the condenser of the present invention with parts partially separated and broken away;

Fig. 2 is a perspective view of the film-formed electrode of the condenser depicted in Fig. 1 with parts broken away;

Fig. 3 is an end view of the device depicted in Fig. 1;

Fig. 4 is an enlarged sectional view on line 4—4 of Fig. 1;

Fig. 5 is a side view of another form of the device of the present invention;

Fig. 6 is a plan view of a strip of electrode material indicating the manner of making one form of the separate electrodes and providing them with edge insulation;

Fig. 7 is an elevational view of the apparatus used in making a condenser unit in coil form;

Fig. 8 is a perspective view of a condenser unit in coil form made by the apparatus depicted in Fig. 7; and Fig. 9 is a plan view of a strip of electrode material used in forming the type of condenser depicted in Fig. 8.

In accordance with the present invention a metallic electrode is formed from a sheet of suitable film-forming material, such as, aluminum, tantalum, magnesium and alloys including one of these metals and another constituent such as silicon, aluminum being preferred. This electrode sheet is provided with a current-blocking film, such as, for example, by the well known electrolytic method with the use of a suitable electrolyte, such as a borax solution. The current-blocking film may then be washed, if desired, in a suitable cleansing solution, after which a thin layer of a film-maintaining composition is applied thereto.

This film-maintaining composition is a plastic or tacky, electrically conductive lacquer including a lacquer base material, such as synthetic resins, for example, phthalic acid resins, ester gums, etc., and cellulose derivatives, for example, nitro-cellulose and cellulose acetate, with which is incorporated a miscible electrically conductive plasticising component, preferably organic in nature, including one of more organic substances such as triacetin, glycol diacetate, dibutyl-phthalate, diethyl-phthalate, triphenyl-phosphate and tricresyl-phosphate. When a lower internal resistance is desired a small amount of an acid, preferably organic in nature to insure good miscibility with the organic lacquer composition, such as formic acid, lactic acid and acetic acid, is added to the lacquer composition. Small amounts of an inert filler, e. g., titanium oxide, chromic oxids, zinc oxide, etc., may be added to thicken the lacquer composition and thus increase the thickness of the layer of film-maintaining composition for higher voltage condensers.

A condenser adapted for filter circuit uses and the like is completed by placing adjacent the layer of film-maintaining composition a thin conductive metallic foil, such as, tinfoil. For alternating current uses the film-formed electrode may be duplicated to complete the unit.

Referring to the drawings, in Fig. 1 is depicted a condenser made in accordance with the present invention including an electrode 10 formed from a thin sheet of film-forming material, preferably aluminum, a thickness of about 3 mils being preferred, provided with a current-blocking film 11 and an overlying strip of edge insulation 12 of any suitable material, such as a mixture of nitro-cellulose and an insulating material, preferably titanium oxide, which may be applied in plastic form and dried. Other insulating materials may be used for the edge insulation such as, for example, strips of cellophane, the edge insulation being used to prevent sparking over at the edges of the electrode of the condenser, or this feature may be obtained by reducing the area of one of the electrodes with respect to the other. This treated electrode is more clearly shown in Fig. 2.

The film-formed surface of this electrode 10 is provided, either by dipping or brushing, with a thin layer of lacquer, preferably comprising an admixture of about 35 per cent of 16 ounce solution of nitro-cellulose, about 15 per cent of triacetin and the remainder of a suitable solvent, such as amyl acetate, or a solvent mixture. This treated electrode is then subjected to heat to drive off the solvent, preferably by placing it in a drier at a temperature of about 110° C., which leaves a thin layer 13 of a tacky, electrically conductive film-maintaining composition sticking to the current-blocking film, and tending to physically protect it and maintain the film in position. The condenser unit is completed by placing adjacent the layer of lacquer composition a thin sheet of tinfoil 14, provided with the edge insulation 12 which is held in position by the sticky character of the lacquer composition. The thickness of the current-blocking film, the layer of lacquer composition and the edge insulation have been exaggerated in the drawings so that these constituent parts may be clearly distinguishable.

The modification shown in Fig. 5 is adapted to obtain series connection of condenser units similar to that depicted in Fig. 1. The film-formed sheet electrodes 10 are alternately stacked with metallic sheets 14, preferably of tinfoil with interposed layers 13 of lacquer composition. In condensers adapted for alternating current operation, all of the sheet electrodes may be formed from aluminum and provided with current-blocking films on both sides thereof. These elements are held in their stacked positions by end plates 15 which may consist of insulating material or conductive metallic material to constitute electrical terminals for the units. These plates are held in their relative positions by steel springs 16 having bearing blocks 17 adapted to engage the end plates 15. These bearing blocks 17 are formed from insulating material when the end plates are formed from metallic material to prevent shorting by the steel springs 16.

The film-formed sheet electrodes may be constructed from a continuous strip of film-formed aluminum 18 and provided with edge insulation by a stamping process, the resulting strip being depicted in Fig. 6. Separate sheet electrodes 10 are then formed by severance along lines 19—19.

The condensers of the present invention may be made in the form of coiled units 20 as depicted in Fig. 8, a core 21 of suitable insulating material, such as wood, being preferably used upon which are wound the sheet electrodes 22 and 23 with interposed layers of lacquer composition. These units are preferably formed by the utilization of the apparatus shown in Fig. 7. A strip of film-formed sheet aluminum 22 is passed successively through a cleansing bath 24, preferably of water, a lacquer admixture 25 and a drier 26, thereby providing the film-formed strip 22 on each side with a layer of a tacky, electrically conductive film-maintaining composition. This treated electrode sheet is then wound up on the core 21 with the other electrode strip 23 adjacent thereto, both electrode strips 22 and 23 being severed at suitable intervals to provide the coiled unit 20 depicted in Fig 8. Both electrode strips 22 and 23 may be provided with edge insulation 27 in any suitable manner prior to the formation of condenser units by the method outlined above.

If desired the completed condenser unit may be externally coated with a suitable insulating material such as pitch or a compound of beeswax and rosin.

In accordance with the present invention the lacquer admixture preferably comprising a lacquer base material of nitro-cellulose, a plasticising component of triacetin and a solvent of amyl acetate may vary somewhat with regard to the amounts of the component parts thereof. The plasticising component is preferably present in the lacquer admixture in an amount of at least about 10 per cent to provide the desirable electrical conductivity unless other constituents such as one or more of the organic acids formic acid, lactic acid and acetic acid, are added to increase the electrical conductivity. The plasticising component may be present in greater amounts up to about 25 per cent, amounts greater than 25 per cent being avoided to prevent softening of the lacquer composition to an undesirable degree. The amount of nitro-cellulose in the admixture preferably bears a ratio to the amount of the plasticising component of triacetin of between about 1:3 and 1:8.

When organic acids, such as formic acid, lactic acid and acetic acid, are added, the amount may be about 5 per cent, such an amount being found to decrease the internal resistance to a desired degree. When an inert filler, such as titanium oxide is added to thicken the lacquer composition this constituent may be present in an amount of about 2 per cent to 5 per cent, greater percentages being avoided to avoid an undesirably high internal resistance.

The film-maintaining lacquer composition appears to protect the current-blocking film on the electrode against injury or displacement in an efficient manner; to maintain this film electrochemically during the operation of the condenser, and the tackiness thereof serves to insure its activity over long periods of use and to secure the units of the condenser together. These condensers in operation have been found to have an average capacitance of about 0.08 m. f. per square inch. They have a characteristic similar to that of electrolytic condensers in that the current-blocking film of the film-formed electrode is maintained during operation and punctures caused by excessive overloads are self-healing to allow continued operation of the condenser. This is borne out by the fact that a unit may be assembled without any pre-forming of a current-blocking film on the film-forming electrode and current passed through the unit resulting in the formation of a current-blocking film on the film-forming electrode. The condensers which are the subject of the present invention differ from the usual electrolytic condensers, however, in the fact, among others, that upon reversal of the polarity of electrical potential applied to them, they retain for a considerable length of time a substantial proportion, in the neighborhood of 60 per cent, of their capacitance whereas electrolytic condensers upon similar reversal of polarity lose their capacitance almost immediately.

It will thus be seen that the present invention efficiently attains the objects set forth above and provides electrical condensers which are compact in form, of simple construction and efficient in operation.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. An electrical condenser comprising a film-formed electrode, a second electrode and an interposed layer of an electrically conductive film-maintaining composition of a lacquer base material and a plasticising component miscible therewith.

2. An electrical condenser comprising a film-formed electrode, a second electrode, and an interposed layer of a plastic electrically conductive film-maintaining cellulose derivative.

3. An electrical condenser comprising a pair of oxide coated electrodes and an interposed layer of an electrically conductive plasticised cellulose in intimate contact with said electrodes.

4. An electrical condenser comprising a film-formed metallic electrode, a thin flexible layer of a tacky film-maintaining composition overlying the film of said electrode and another metallic electrode spaced from said first mentioned electrode by said layer, said tacky film-maintaining composition comprising a cellulose derivative and a plasticising component miscible therewith which renders it electrically conductive and maintains the tacky condition thereof.

5. An electrical condenser comprising a film-formed electrode, a second electrode and an interposed layer of a tacky electrically conductive film-maintaining composition of a cellulose derivative and a plasticising component including at least one of the substances triacetin, glycol diacetate, dibutyl-phthalate and including at least one of the organic acids formic, lactic, and acetic.

6. An electrical condenser comprising a film-formed electrode, a second electrode and an interposed layer of a tacky composition of a cellulose derivative and a plasticising component including one of the substances triacetin and glycol diacetate.

7. An electrical condenser comprising a film-formed electrode, a second electrode and an interposed layer of a tacky composition including triacetin and one of the substances nitro-cellulose and cellulose acetate.

8. An electrical condenser comprising a film-formed aluminum electrode, a thin flexible layer of a tacky composition including nitro-cellulose and triacetin overlying the film of said electrode and another metallic electrode spaced from the first mentioned electrode by said layer.

9. An electrical condenser comprising a film-formed aluminum electrode, a thin flexible layer of a tacky composition including nitro-cellulose and triacetin and overlying the film of said electrode, and another metallic electrode spaced from the first mentioned electrode by said layer, the amount of said nitro-cellulose bearing a ratio to the amount of said triacetin of between about 1:3 and 1:8.

10. An electrical condenser comprising a film-formed electrode, a thin flexible layer of a tacky composition including a lacquer base material, a plasticising component miscible therewith which renders it electrically conductive and provides tackiness and flexibility and a small amount of an inert filler, and another metallic electrode spaced from the first mentioned electrode by said layer.

11. An electrical condenser comprising a pair of electrodes at least one of which is film-formed, and an electrically conductive plasticised cellulose lacquer spacer containing a finely divided inorganic inert filler, said lacquer spacer being in intimate contact with said electrodes.

12. A tacky film-maintaining composition for electrical condensers including a cellulose derivative component and a plasticising component miscible therewith which renders it electrically conductive and provides tackiness and flexibility with the components evenly distributed throughout.

13. A tacky film-maintaining composition for electrical condensers comprising one of the esters nitro-cellulose and cellulose acetate, a plasticising component including at least one of the organic substances triacetin, glycol diacetate, dibutyl-phthalate, and at least one of the organic acids formic, lactic and acetic.

14. A tacky film-maintaining composition for electrical condensers including nitro-cellulose and triacetin.

15. A tacky film-maintaining composition for electrical condensers including a cellulose derivative component, an inert filler and a plasticising component miscible therewith which renders it electrically conductive and provides tackiness and flexibility with the components evenly distributed throughout.

16. A film-maintaining admixture for electrical condensers comprising one of the esters nitro-cellulose and cellulose acetate, between about 2 per cent and 5 per cent of one of the substances titanium oxide, chromic oxide and zinc oxide, a plasticising component including at least one of the organic substances triacetin, glycol diacetate, dibutyl-phthalate, at least one of the organic acids, formic, lactic and acetic, and an organic solvent, said admixture having the components thereof evenly distributed throughout.

17. A film-maintaining admixture for electrical condensers comprising nitro-cellulose, between about 10 per cent and 25 per cent triacetin, and an organic solvent, said admixture having the components thereof evenly distributed throughout.

18. A film-maintaining admixture for electrical condensers including nitro-cellulose, an inert filler, triacetin and an organic solvent, the amount of said nitro-cellulose bearing a ratio to the amount of said triacetin of between about 1:3 and 1:8, said inert filler comprising between about 2 per cent and 5 per cent of said admixture and said triacetin comprising between about 10 per cent and 25 per cent of said admixture.

19. A tacky film-maintaining composition for electrical condensers comprising one of the esters nitro-cellulose and cellulose acetate and a plasticising component including at least one of the organic substances triacetin, glycol, diacetate, dibutyl-phthalate.

20. An electrical condenser comprising a pair of electrodes one of which is film forming separated by a film maintaining composition comprising one of the esters nitro-cellulose and cellulose acetate, an organic plasticising component, and a finely divided filler of at least one of the substances titanium oxide, chromic oxide and zinc oxide.

21. A film-maintaining admixture for electrical condensers comprising one of the esters nitro-cellulose and cellulose acetate, at least one of the substances titanium oxide, chromic oxide and zinc oxide, and a plasticising component including at least one of the organic substances triacetin, glycol diacetate and dibutyl-phthalate, said admixture having the components thereof evenly distributed throughout.

22. An electrical condenser comprising a film-formed electrode, a second electrode, and an interposed plastic electrically conductive film-maintaining spacing medium composed of a cellulose derivative and an electrically conductive plasticising component.

23. An electrolytic condenser comprising two electrodes, one of which is film forming, and a film maintaining conductive plastic spacing medium in contact with said electrodes composed of a homogeneous non-fibrous cellulose material and an electrically conductive plasticising film-maintaining component carried and held by said cellulose material.

SAMUEL RUBEN.

CERTIFICATE OF CORRECTION.

Patent No. 1,918,717.             July 18, 1933.

SAMUEL RUBEN.

It is hereby certified that error appears in the printed specification of the above numbered patent requiring correction as follows: Page 2, line 25, for "of" read "or"; and that the said Letters Patent should be read with this correction therein that the same may conform to the record of the case in the Patent Office.

Signed and sealed this 12th day of September, A. D. 1933.

M. J. Moore.

(Seal)                   Acting Commissioner of Patents.